United States Patent [19]

Vinko et al.

[11] 4,173,174

[45] Nov. 6, 1979

[54] INSTALLATION FOR THE SUPPLY OF FRESH AND/OR HEATED AIR INTO THE INTERIOR SPACE OF A MOTOR VEHICLE

[75] Inventors: Michael Vinko, Munich; Dieter Schmid, Neufahrn, both of Fed. Rep. of Germany

[73] Assignee: Bayerische Motoren Werke Aktiengesellschaft, Fed. Rep. of Germany

[21] Appl. No.: 821,235

[22] Filed: Aug. 2, 1977

[30] Foreign Application Priority Data

Aug. 13, 1976 [DE] Fed. Rep. of Germany ....... 2636640

[51] Int. Cl.² ............................................. B60H 1/24
[52] U.S. Cl. ..................................... 98/2.04; 98/2.06; 98/2.08; 98/2.13
[58] Field of Search ................... 98/2, 2.04, 2.05, 2.06, 98/2.08, 2.12, 2.13, 19

[56] References Cited

U.S. PATENT DOCUMENTS

| | | | |
|---|---|---|---|
| 2,150,110 | 3/1939 | Strauss et al. ............................ | 98/2 |
| 2,664,308 | 12/1953 | Appel ................................... | 98/2.06 |
| 2,919,907 | 1/1960 | Simons ................................. | 98/2.06 |
| 3,602,126 | 8/1971 | Breitschwerdt ....................... | 98/2.04 |

FOREIGN PATENT DOCUMENTS

2338878 2/1975 Fed. Rep. of Germany ............ 98/2.12

*Primary Examiner*—Henry C. Yuen
*Attorney, Agent, or Firm*—Craig and Antonelli

[57] ABSTRACT

An installation for the supply of fresh and/or heated air into the interior space of a motor vehicle which is equipped with an air guide channel within the area of the inner covering of a body part; the air guide channel is formed by a part of the inner wall of the vehicle body part and by a cover member mounted thereon and is in communication with the vehicle interior space by way of discharge openings directed into the vehicle interior space; recesses are thereby provided within the edge area of the cover member and/or within the inner covering adjoining the same or in the vehicle body part adjoining the cover member which form the discharge openings.

8 Claims, 3 Drawing Figures

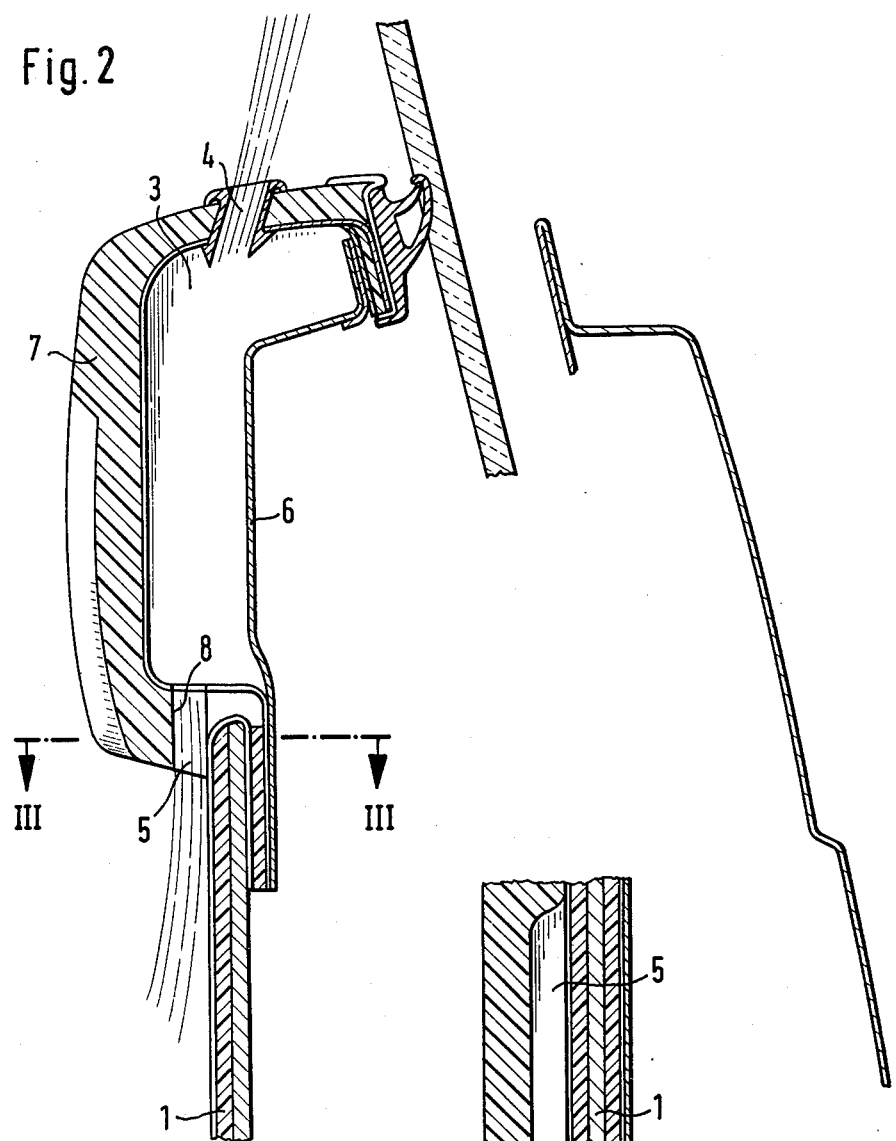

INSTALLATION FOR THE SUPPLY OF FRESH AND/OR HEATED AIR INTO THE INTERIOR SPACE OF A MOTOR VEHICLE

The present invention relates to an installation for the feed of fresh and/or heated air into the interior space of a motor vehicle, especially of a passenger motor vehicle, with at least one air guide channel provided within the area of the inner covering of a vehicle body part, which is formed by a part of the inner wall of the vehicle body part and by a cover member mounted over the same and which is in communication with discharge openings directed into the vehicle interior space.

Air guide or conduction channels for the heating and/or the ventilation of a passenger motor vehicle are already known in different constructions. The German Offenlegungsschrift No. 1,755,559 discloses, for example, an inner covering made of foamed material of a door of a passenger motor vehicle which is provided with air guide channels. Such an inner covering, however, can be manufactured only by means of very expensive tools and has to be replaced in its entirety in case of leakage of an air guide channel. Additionally, separate air guide channels arranged between covering and outer sheet metal door panel are disclosed in the German Offenlegungsschrift No. 2,010,063 which may consist of sheet metal or synthetic plastic material. In both cases, the air guide channels are also costly to manufacture and can be assembled and installed only with considerable expenditure of time.

A curved or arcuate cover member which is arranged within the area of the instrument panel of a passenger motor vehicle is disclosed in the German Gebrauchsmuster No. 1,909,519, which together with a sheet metal body panel forms an air guide channel and includes a number of discharge openings directed into the vehicle interior space. However, such discharge openings can be provided only with considerable manufacturing expenditures.

It is the aim of the present invention to provide an air guide channel with discharge openings provided within the area of the inner covering of a passenger motor vehicle, which can be manufactured favorably as regards costs and is adapted to be installed with smallest expenditures.

The underlying problems are solved according to the present invention in that recesses are provided within the edge area of the cover member and/or within the inner covering resting against the same or the vehicle body part adjoining the cover member, which form the discharge openings.

Since the air guide channel is formed by a mere mounting of a cover member on an already present interior sheet metal wall panel of the passenger motor vehicle, it can be manufactured more favorably as regards cost than the aforementioned air guide channels and can be replaced in case of damage without any problem and with slight installation expenditure. In case the air guide channel has to be replaced by reason of a damage, it is additionally advantageous that only the relatively inexpensive cover member has to be replaced whereas the inner covering remains preserved.

Provision is made in one embodiment of the present invention that the cover member has an essentially U-shaped cross-sectional profile and the discharge openings are provided at both U-legs.

A further feature of the present invention resides in that the cover member adjoins the upper edge of the inner covering and extends essentially horizontally whereby at least the lower U-leg is provided along the edge area with recesses for the formation of the discharge openings.

In another advantageous construction of the present invention, the discharge openings may be directed approximately parallel to the adjoining inner covering within the cover member.

Accordingly, it is an object of the present invention to provide an installation for the feed of fresh and/or heated air into the interior space of a motor vehicle which avoids by simple means the aforementioned shortcomings and drawbacks encountered in the prior art.

Another object of the present invention resides in an installation for the supply of fresh and/or heated air into the interior space of a motor vehicle which is relatively inexpensive in manufacture and installation.

A further object of the present invention resides in an installation for the supply of fresh and/or heated air into the interior space of a motor vehicle, which can be readily repaired in case of damage, requiring the replacement of only relatively inexpensive covering parts even in case of serious damage.

Still a further object of the present invention resides in an installation of the type described above whose individual parts can be readily manufactured without requiring expensive tools.

These and further objects, features and advantages of the present invention will become more apparent from the following description when taken in connection with the accompanying drawing which shows, for purposes of illustration only, one embodiment in accordance with the present invention, and wherein:

FIG. 2 is a cross-sectional view, on an enlarged scale, taken along line II—II of FIG. 1; and FIG. 3 is a cross-sectional view, taken along line III—III of FIG. 2.

Figure 1:
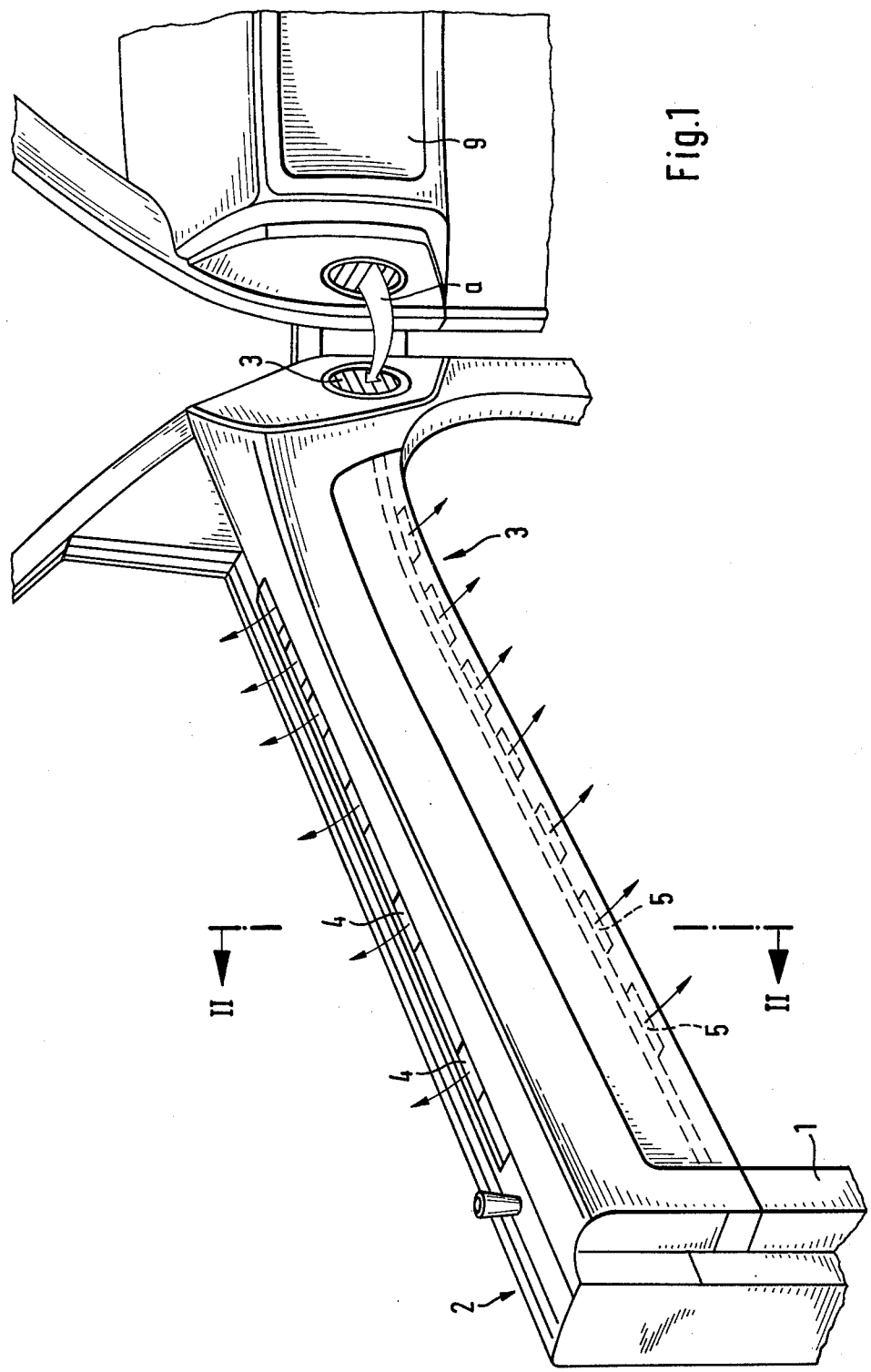
FIG. 1 is a partial perspective view of an air guide channel in accordance with the present invention arranged at the door of a passenger motor vehicle.

Referring now to the drawing wherein like reference numerals are used throughout the various views to designate like parts, and more particularly to FIG. 1, an air guide channel 3 is provided at the inner covering 1 of a door 2 of a passenger motor vehicle, which is in communication with several discharge openings 4 and 5, respectively along its top and bottom side.

The air guide channel 3 is formed by a part of the interior sheet metal wall 6 and by a cover member 7 (FIG. 2) mounted thereon. The cover member 7 has a U-shaped cross-sectional profile and extending essentially horizontally adjoins the upper edge of the inner covering 1 of the door 2. The discharge openings 4 are arranged in the upper U-leg whereas the lower U-leg includes along its edge area sectionwise a number of recesses 8 for the formation of discharge openings 5 upon its abutment at the inner sheet metal wall 6. The discharge openings 5 provided in the cover member 7 extend essentially parallel to the inner covering 1 connected therewith. The inner covering 1 is connected with the door 2 by means of screws, clips or the like.

According to a further embodiment (not shown) recesses may also be provided in the inner covering or in the inner sheet metal wall panel, whence discharge openings similarly directed into the vehicle interior space result therefrom. Furthermore, it is possible that the recesses are provided, on the one hand, at the cover member and, on the other, at the inner covering and/or the inner sheet metal wall panel.

The air for heating or ventilating the vehicle interior space which is supplied from a blower or by the dynamic air pressure reaches the air guide channel 3, as indicated in FIG. 1 by arrow a, by way of a feed channel located underneath the cover of the instrument panel 9.

Of course, within the scope of the present invention, the air guide channel formed by a part of the inner sheet metal wall panel and by a cover member mounted thereon may be arranged in any area of the vehicle interior space, for example, at the rear side windows. Furthermore, it is also feasible within the scope of the present invention that the upper U-leg of the covering part is also provided in its edge area with recesses disposed adjacent the side windowpane.

While we have shown and described only one embodiment in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. An installation for the supply of fresh and/or heated air into the interior space of a motor vehicle, comprising at least one air-guide channel means provided within the area of an inner covering means of a vehicle body part, said air guide channel means being formed by a part of an inner wall of the vehicle body part and by a cover member mounted thereon and being in communication with air discharge openings directed into the vehicle interior space, characterized in that recess means forming said air discharge openings are provided within at least one of an edge area of the cover member, the inner covering means adjoining the cover member and the vehicle body part adjoining the cover member, and further characterized in that the cover member has an essentially U-shaped cross-sectional profile and the discharge openings are provided at both U-legs.

2. An installation according to claim 1, characterized in that the recess means are formed within the edge area of the cover member and within one of the inner covering means and the part of the vehicle body.

3. An installation according to claim 1, characterized in that the cover member adjoins the upper edge of the inner covering means and extends essentially horizontally.

4. An installation according to claim 3, characterized in that at least the lower U-leg is provided with recess means along its edge area for the formation of the discharge openings.

5. An installation according to claim 4, characterized in that the discharge openings are directed in the cover member approximately parallel to the adjoining inner covering means.

6. An installation according to claim 5, characterized in that the recess means are formed within the edge area of the inner cover member and within one of the inner covering means and the part of the vehicle body.

7. An installation according to claim 1, characterized in that at least the lower U-leg is provided with recess means along its edge area for the formation of the discharge openings.

8. An installation according to claim 1, characterized in that the discharge openings are directed in the cover member approximately parallel to the adjoining inner covering means.

* * * * *